United States Patent
Matsumura et al.

(10) Patent No.: US 6,264,730 B1
(45) Date of Patent: Jul. 24, 2001

(54) WATER RESISTANT INK COMPOSITION

(75) Inventors: Kazuyuki Matsumura; Masaaki Yamaya, both of Usui-gun (JP)

(73) Assignee: Shin-Etsu Chemical Co., Ltd. (JP)

( * ) Notice: Subject to any disclaimer, the term of this patent is extended or adjusted under 35 U.S.C. 154(b) by 0 days.

(21) Appl. No.: 09/461,033

(22) Filed: Dec. 15, 1999

(30) Foreign Application Priority Data

Dec. 16, 1998 (JP) .................................................. 10-358071

(51) Int. Cl.$^7$ ..................................................... C09D 11/02
(52) U.S. Cl. ..................................... 106/31.43; 106/31.28; 106/31.75; 106/287.11
(58) Field of Search ............................. 106/31.43, 31.28, 106/31.75, 287.11

(56) References Cited

U.S. PATENT DOCUMENTS

| | | | |
|---|---|---|---|
| 4,045,397 | 8/1977 | Parkinson | 106/31.27 |
| 4,284,548 | * 8/1981 | Kaufman et al. | 525/342 |
| 5,068,277 | * 11/1991 | Vukov et al. | 106/287.11 |
| 5,256,191 | * 10/1993 | Thompson et al. | 106/31.93 |
| 5,340,386 | * 8/1994 | Vincent et al. | 105/31.6 |
| 5,693,127 | * 12/1997 | Nigam et al. | 106/31.6 |
| 5,935,311 | 8/1999 | Matsumura et al. | 106/31.43 |

FOREIGN PATENT DOCUMENTS

| | | |
|---|---|---|
| 0 012 835 | 7/1980 | (EP) . |
| 0 819 744 | 1/1998 | (EP) . |
| 0 856 566 | 8/1998 | (EP) . |
| 0940456 | * 9/1999 | (EP) . |
| 6-279678 | 10/1994 | (JP) . |
| 10-212439 | 8/1998 | (JP) . |

OTHER PUBLICATIONS

English abstract of JP–A 6–279678, Oct. 1994.
Shikizai (Coloring Matter) 67 [6], 356–361 (1994), No Month Available.
Shikizai (Coloring Matter) 66 [9], 517–522 (1994), No Month Available.

* cited by examiner

*Primary Examiner*—Helene Klemanski
(74) *Attorney, Agent, or Firm*—Millen, White, Zelano & Branigan, P.C.

(57) ABSTRACT

Water resistant ink compositions comprising (1) a water-soluble dye compound and/or an organic pigment compound, (2) an organosilicon compound prepared by hydrolyzing (A) a hydrolyzable silane obtained by reacting a specific aminated organic group-bearing hydrolyzable silane with a specific acrylic acid or acrylic ester compound, or a partial hydrolyzate thereof, and (B) another specific hydrolyzable silane or a partial hydrolyzate thereof, and (3) water have excellent water-resistance, good storage stability, good ink discharge stability, and outstanding color stability. The ink compositions are well suited for ink-jet printing.

8 Claims, No Drawings

WATER RESISTANT INK COMPOSITION

BACKGROUND OF THE INVENTION

1. Field of the Invention

This invention relates to water resistant ink compositions which are highly suitable for use in recording methods that employ aqueous inks, and especially ink-jet printing. These compositions, when printed onto a recording medium and dried, form printed images which experience no loss whatsoever in quality even upon accidental exposure to water or beverages. Moreover, they have excellent color stability.

2. Prior Art

Ink-jet printing makes use of a number of different ink discharge techniques to form droplets of ink and deposit some or all of the droplets on a recording medium such as paper (the term "ink" being used here to refer broadly to recording liquids). Examples of such techniques include electrostatic absorption, the application of mechanical vibrations or changes to the ink using a piezoelectric element, and thermal bubble formation from the ink combined with use of the resulting pressure. These ink-jet printing methods are notable because they generate little noise and enable high-speed, multicolor printing.

The inks commonly used in ink-jet printing contain water as the main component to provide safety and good recording characteristics. Polyhydric alcohols are also included to prevent clogging of the nozzles in the ink-jet printing system and to enhance discharge stability.

In order to keep pace with the better performance and more widespread use recently of ink-based recording systems and related technology, further improvement needs to be made in the properties of ink compositions. This need for improvement is particularly acute with regard to the water-resistance of inks. The past few years have seen a very rapid rise in the use of ink-jet printers, both in the office and at home. However, in the home and office environment, there is a greater chance of printed matter coming into contact with water or beverages such as coffee or soda. Under such conditions, it is essential that the ink be water resistant.

Efforts have been made to use pigment-containing inks because of their excellent water-resistance. A major drawback has been the inferior color development of printed images obtained with pigment-containing inks compared with printed images obtained with dye-containing inks.

Very few if any of the water-soluble dye-containing inks with good color development currently on the market are water resistant. So when a printed image comes into contact with water, for instance, the image is almost always ruined by color bleeding or the like. Because both the dye itself and the polyhydric alcohol added to improve the discharge stability of the ink are water-soluble, direct contact of the printed image with water allows these components to dissolve out into the water, destroying the quality of the image.

Of course, the polyhydric alcohol component of a dye-containing ink may be excluded to provide better water-resistance, but this results in a poor discharge stability. An attempt to confer reactivity to the dye itself so that it bonds with the substrate is reported in *Shikizai* (Coloring Matter), 67, 6, 356–361 (1994). This attempt consists of introducing alkoxysilyl groups onto the dye molecule to make it reactive. Unfortunately, it is difficult to successfully incorporate alkoxysilyl groups since polar groups such as —$SO_3Na$, —$NH_2$ and —CN are normally included in water-soluble dyes to confer water solubility, and these polar groups tend to react with the alkoxysilyl groups. Moreover, the resulting dyes have a poor stability in aqueous solutions, and are also unduly expensive.

Another method is described in *Shikizai*, 66, 9, 517–522 (1993), wherein a dye is added to tetraethoxysilane or methyltriethoxysilane to form a sol. A glass substrate is then treated with the sol to immobilize the dye. However, a major disadvantage of this approach is that such a sol gels immediately upon addition to a basic aqueous ink, and thus cannot be used in aqueous inks.

Another approach commonly taken is to use silicone compounds as additives for imparting water-resistance. Such compounds do indeed confer excellent water-resistance in solvent systems, but their stability in water is rather poor. At best, they are somewhat stable under weakly acidic conditions, but generally lose all stability when the system is even mildly alkaline. Given that water-soluble dyes are most often alkaline, silicone compounds are of no use in such a system.

Water-soluble polyamines have been used in quite a few cases recently to provide water-soluble dyes with water-resistance. However, one drawback has been intense color changes which alter the color tone of the dye, probably due to the decomposition of azo groups in the dye on account of the reactivity and basicity of the amino groups, and especially primary amino groups, on the polyamine.

JP-A 6-279678 discloses an aqueous surface treatment composition in the form of an aqueous solution which contains as a primary component either the hydrolyzate of the product obtained by reacting an aminotrialkoxysilane with an organic compound that reacts with the amino group on the silane, or the product obtained by then reacting this hydrolyzate with an organometallic compound such as a tetraalkoxysilane. Although blocking of the amino group limits changes in the color tone to some degree, the use of polydiglycidyl compounds as the blocking agent destabilizes the solution itself, such as by making it subject to gelation. This method also calls for the addition of an anionic surfactant as the stabilizer, which can be detrimental to the water-resistance. Another problem has been the instability of the solution under alkaline conditions, making it of little use as an additive in water-soluble ink compositions.

The applicant proposed, in JP-A 10-212439, a water resistant ink composition comprising an organosilicon compound prepared by hydrolyzing components (A) and (B) used in the present invention. However, when used as magenta or black inks, this composition does not have sufficient stability at relatively high temperatures.

SUMMARY OF THE INVENTION

It is, therefore, an object of the present invention to provide ink compositions highly suitable for use in recording methods that employ aqueous inks, and especially ink-jet printing, which ink compositions have both excellent water-resistance, enabling images printed therewith to be completely resistant to attack by water, and excellent color stability.

We have found that ink compositions which achieve this object can be obtained by formulating (1) a water-soluble dye compound and/or an organic pigment compound, (2) an organosilicon compound, and (3) water in specific proportions. The organosilicon compound (2) is prepared by hydrolyzing (A) 100 parts by weight of a hydrolyzable silane prepared by the addition reaction of
an aminated organic group-bearing hydrolyzable silane of the general formula:

$$YR^1{}_m SiR^2{}_{3-m} \qquad (a)$$

wherein $R^1$ is a substituted or unsubstituted monovalent hydrocarbon group of 1 to 8 carbons, $R^2$ is an alkoxy or acyloxy group of 1 to 4 carbons, Y is an aminated organic group and the letter m is 0 or 1, with
an acrylic acid or acrylic ester compound of the general formula:

$$CH_2=CR^3-COOR^4 \qquad (b)$$

wherein $R^3$ is hydrogen or methyl, and $R^4$ is hydrogen, a substituted or unsubstituted monovalent hydrocarbon group which may have a hydroxyl or carbonyl moiety, a group of the formula $-R^5-SiR^1{}_a R^2{}_{3-a}$, (wherein $R^1$ and $R^2$ are as defined above, $R^5$ is a divalent hydrocarbon group, and the letter a is 0 or 1) or a group of the formula $-(CH_2CHR^3O)_b R^6$ (wherein $R^3$ is as defined above, $R^6$ is hydrogen or a substituted or unsubstituted monovalent hydrocarbon group, and the letter b is an integer from 1 to 50), in an amount corresponding to from 0.01 to 20 moles per mole of amino groups on the hydrolyzable silane of formula (a), or a partial hydrolyzate thereof, in combination with
(B) 5 to 200 parts by weight of a hydrolyzable silane of the general formula:

$$R^7{}_n SiR^8{}_{4-n} \qquad (c)$$

wherein $R^7$ is a substituted or unsubstituted monovalent hydrocarbon group of 1 to 8 carbons, $R^8$ is an alkoxy or acyloxy group of 1 to 4 carbons and the letter n is 0, 1 or 2, or a partial hydrolyzate thereof.

These ink compositions are very well suited for use in recording methods that employ aqueous inks, especially ink-jet printing, and have such outstanding water-resistance that images printed with these inks are completely resistant to attack by water. Moreover, they are not susceptible to changes in color tone due to deleterious effects by amino groups, and thus have excellent color stability.

Accordingly, the present invention provides water resistant ink compositions comprising (1) 10 parts by weight of a water-soluble dye compound and/or an organic pigment compound; (2) 2 to 60 parts by weight of an organosilicon compound prepared by hydrolyzing (A) 100 parts by weight of a hydrolyzable silane prepared by the addition reaction of an aminated organic group-bearing hydrolyzable silane of above formula (a) with an acrylic acid or acrylic ester compound of above formula (b) in an amount corresponding to from 0.01 to 20 moles per mole of amino groups in the hydrolyzable silane, or a partial hydrolyzate thereof, in combination with (B) 5 to 200 parts by weight of a hydrolyzable silane of above formula (c), or a partial hydrolyzate thereof; and (3) 30 to 10,000 parts by weight of water.

DETAILED DESCRIPTION OF THE INVENTION

The water-soluble dye compound serving as component (1) in the invention may be any compound used as a dye component in ordinary water-soluble inks, although compounds known and used as coloring ingredients for imparting colors such as black, cyan, magenta, or yellow are preferred. Illustrative, non-limiting examples include yellow dyes such as Acid Yellow 23, Acid Yellow 79 and Direct Yellow 86; magenta dyes such as Acid Red 14, Acid Red 52, Acid Red 87, Acid Red 92, Acid Red 289 and Reactive Red 4; cyan dyes such as Acid Blue 9, Acid Blue 92, Acid Blue 87, Direct Blue 86 and Reactive Blue 15; and black dyes such as Acid Black 2, Direct Black 22, Direct Black 154 and Food Black 2.

These dyes are commonly modified with a sodium sulfonate to confer water solubility. Even though the modified dyes are almost always alkaline when dissolved in water, they can be very effectively used.

Suitable examples of organic pigments which may be used in the invention include Aniline Black, Fast Yellow, Disazo Yellow, Permanent Orange, Risol Red, Lake Red C, Permanent Red 2B, Brilliant Carmine 6B, Carmine 3B, Cobalt Violet, Methyl Violet Lake, Phthalocyanine Blue, Fast Sky Blue, and Phthalocyanine Green.

The organosilicon compound used as component (2) in the invention imparts water-resistance to the inventive ink composition. Surprisingly, this component is readily soluble in aqueous solutions, and moreover has a high stability even in alkaline aqueous solutions. In addition, because it does not attack chromophores such as azo radicals on the dye, the color tone remains unaffected by it for a long period of time.

The organosilicon compound is prepared by hydrolyzing (A) 100 parts by weight of a hydrolyzable silane or a partial hydrolyzate thereof and (B) 5 to 200 parts by weight of another hydrolyzable silane or a partial hydrolyzate thereof.

Component (A) is a hydrolyzable silane which is prepared by the addition reaction of (i) an aminated organic group-bearing hydrolyzable silane of the general formula:

$$YR^1{}_m SiR^2{}_{3-m} \qquad (a)$$

wherein $R^1$ is a substituted or unsubstituted monovalent hydrocarbon group of 1 to 8 carbons, $R^2$ is an alkoxy or acyloxy group of 1 to 4 carbons, Y is an aminated organic group and the letter m is 0 or 1, with (ii) an acrylic acid or acrylic ester compound of the general formula:

$$CH_2=CR^3-COOR^4 \qquad (b)$$

wherein $R^3$ is hydrogen or methyl, and $R^4$ is hydrogen, a substituted or unsubstituted monovalent hydrocarbon group which may have a hydroxyl or carbonyl moiety, a group of the formula $-R^5-SiR^1{}_a R^2{}_{3-a}$ (wherein $R^1$ and $R^2$ are as defined above, $R^5$ is a divalent hydrocarbon group, and the letter a is 0 or 1) or a group of the formula $-(CH_2CHR^3O)_b R^6$ (wherein $R^3$ is as defined above, $R^6$ is hydrogen or a substituted or unsubstituted monovalent hydrocarbon group, and the letter b is an integer from 1 to 50), in an amount corresponding to from 0.01 to 20 moles per mole of amino groups on the hydrolyzable silane of formula (a), or a partial hydrolyzate thereof. Component (B) is a hydrolyzable silane of the general formula:

$$R^7{}_n SiR^8{}_{4-n} \qquad (c)$$

wherein $R^7$ is a substituted or unsubstituted monovalent hydrocarbon group of 1 to 8 carbons, $R^8$ is an alkoxy or acyloxy group of 1 to 4 carbons and the letter n is 0, 1 or 2, or a partial hydrolyzate thereof.

Component (A) is used here in order to confer water solubility to the target organosilicon compound, and thus render the system water-soluble.

In formula (a), $R^1$ is a substituted or unsubstituted monovalent hydrocarbon group having 1 to 8 carbons, exemplified by unsubstituted monovalent hydrocarbon groups such as alkyl, alkenyl, aryl and aralkyl groups; and substituted monovalent hydrocarbon groups in which some or all of the hydrogen atoms on the foregoing groups are substituted with halogen atoms, such as halogenated alkyl groups. Illustrative examples of suitable monovalent hydrocarbon groups include —$CH_3$, —$CH_2CH_3$, —$CH_2CH_2CH_3$, —$CH(CH_3)_2$, —$CH_2CH_2CH_2CH_3$, —$CH(CH_3)CH_2CH_3$, —$CH_2CH(CH_3)CH_3$, —$C(CH_3)_3$, —$C_6H_5$ and —$C_6H_{13}$.

$R^2$ is an alkoxy or acyloxy group having 1 to 4 carbons, illustrative examples of which include —$OCH_3$, —$OCH_2CH_3$, —$OCH_2CH_2CH_3$, —$OCH(CH_3)_2$, —$OCH_2CH_2CH_2CH_3$, —$OCH(CH_3)CH_2CH_3$, —$OCH_2CH(CH_3)_2$, —$OC(CH_3)_3$, —$OCOCH_3$ and —$OCOCH_2CH_3$.

Y is an aminated organic group exemplified by groups of the formula:

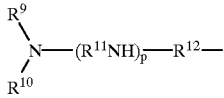

wherein $R^9$ and $R^{10}$ are each independently hydrogen or a monovalent hydrocarbon group of 1 to 8 carbons, $R^{11}$ and $R^{12}$ are each independently a divalent hydrocarbon group of 1 to 8 carbons, and p is 0 or an integer from 1 to 3. Here, the monovalent hydrocarbon groups of 1 to 8 carbons are exemplified by the same groups as mentioned above for $R^1$, and the divalent hydrocarbon groups of 1 to 8 carbons are exemplified by alkylene groups.

Illustrative examples of the aminated organic group represented by Y include $H_2NCH_2$—, $H(CH_3)NCH_2$—, $H_2NCH_2CH_2$—, $H(CH_3)NCH_2CH_2$—, $H_2NCH_2CH_2CH_2$—, $H(CH_3)NCH_2CH_2CH_2$—, $(CH_3)_2NCH_2CH_2CH_2$—, $H_2NCH_2CH_2NHCH_2CH_2CH_2$—, $H(CH_3)NCH_2CH_2NHCH_2CH_2CH_2$—, $(CH_3)_2NCH_2CH_2NHCH_2CH_2CH_2$—, $H_2NCH_2CH_2NHCH_2CH_2NHCH_2CH_2CH_2$— and $H(CH_3)NCH_2CH_2NHCH_2CH_2NHCH_2CH_2CH_2$—. Of these, $H_2NCH_2CH_2CH_2$—, $H_2NCH_2CH_2NHCH_2CH_2CH_2$—, and $H_2NCH_2CH_2NHCH_2CH_2NHCH_2CH_2CH_2$— are preferred.

Illustrative examples of the aminated organic group-bearing hydrolyzable silane of above formula (a) include:
$H_2NCH_2Si(OCH_3)_3$,
$H_2NCH_2Si(OCH_2CH_3)_3$,
$H_2NCH_2SiCH_3(OCH_3)_2$,
$H_2NCH_2SiCH_3(OCH_2CH_3)_{21}$,
$H_2NCH_2CH_2Si(OCH_3)_3$,
$H_2NCH_2CH_2Si(OCH_2CH_3)_3$,
$H_2NCH_2CH_2SiCH_3(OCH_3)_2$,
$H_2NCH_2CH_2SiCH_3(OCH_2CH_3)_2$,
$H_2NCH_2CH_2CH_2Si(OCH_3)_3$,
$H_2NCH_2CH_2CH_2Si(OCH_2CH_3)_3$,
$H_2NCH_2CH_2CH_2SiCH_3(OCH_3)_2$,
$H_2NCH_2CH_2CH_2SiCH_3(OCH_2CH_3)_3$,
$H(CH_3)NCH_2CH_2CH_2Si(OCH_3)_3$,
$H(CH_3)NCH_2CH_2CH_2Si(OCH_2CH_3)_3$,
$H(CH_3)NCH_2CH_2CH_2SiCH_3(OCH_3)_2$,
$H(CH_3)NCH_2CH_2CH_2SiCH_3(OCH_2CH_3)_2$,
$H_2NCH_2CH_2NHCH_2CH_2CH_2Si(OCH_3)_3$,
$H_2NCH_2CH_2NHCH_2CH_2CH_2Si(OCH_2CH_3)_3$,
$H_2NCH_2CH_2NHCH_2CH_2CH_2SiCH_3(OCH_3)_2$,
$H_2NCH_2CH_2NHCH_2CH_2CH_2SiCH_3(OCH_2CH_3)_2$,
$H(CH_3)NCH_2CH_2NHCH_2CH_2CH_2Si(OCH_3)_3$,
$H(CH_3)NCH_2CH_2NHCH_2CH_2CH_2Si(OCH_2CH_3)_3$,
$H(CH_3)NCH_2CH_2NHCH_2CH_2CH_2SiCH_3(OCH_3)_2$,
$H(CH_3)NCH_2CH_2NHCH_2CH_2CH_2SiCH_3(OCH_2CH_3)_2$,
$H_2NCH_2CH_2NHCH_2CH_2NHCH_2CH_2CH_2Si(OCH_3)_3$,
$H_2NCH_2CH_2NHCH_2CH_2NHCH_2CH_2CH_2Si(OCH_2CH_3)_3$,
$H_2NCH_2CH_2NHCH_2CH_2NHCH_2CH_2CH_2SiCH_3(OCH_3)_2$ and
$H_2NCH_2CH_2NHCH_2CH_2NHCH_2CH_2CH_2SiCH_3(OCH_2CH_3)_2$.

Of these, the following are preferred:
$H_2NCH_2CH_2NHCH_2CH_2CH_2Si(OCH_3)_3$,
$H_2NCH_2CH_2NHCH_2CH_2CH_2Si(OCH_2CH_3)_3$,

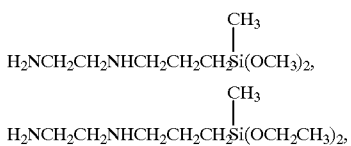

$H_2NCH_2CH_2CH_2Si(OCH_3)_3$,
$H_2NCH_2CH_2CH_2Si(OCH_2CH_3)_3$,

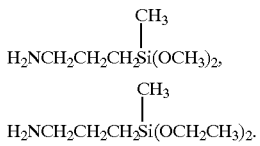

The acrylic acid or acrylic ester compound which is addition-reacted with the aminated organic group-bearing hydrolyzable silane of above formula (a) has the following general formula (b).

$$CH_2=CR^3—COOR^4 \qquad (b)$$

In formula (b), $R^3$ is hydrogen or methyl, and $R^4$ is hydrogen, a substituted or unsubstituted monovalent hydrocarbon group which may have a hydroxyl or carbonyl moiety, a group of the formula —$R^5$—$SiR^1_aR^2_{3-a}$ or a group of the formula —$(CH_2CHR^3O)_bR^6$ wherein $R^1$, $R^2$ and $R^3$ are as defined above, $R^5$ is a divalent hydrocarbon group, $R^6$ is hydrogen or a substituted or unsubstituted monovalent hydrocarbon group, the letter a is 0 or 1, the letter b is an integer from 1 to 50.

The substituted or unsubstituted monovalent hydrocarbon group represented by $R^4$ are preferably those having 1 to 20 carbons, and especially 1 to 18 carbons. Examples include alkyl groups such as methyl, ethyl, propyl, butyl, hexyl, octyl, decyl, lauryl, stearyl, alkenyl groups such as vinyl, allyl, propenyl, butenyl, hexenyl, aryl groups such as phenyl, and aralkyl groups such as benzyl; and these same monovalent hydrocarbon groups in which some or all of the hydrogens are replaced with substituents such as halogen atoms or hydroxyl groups, exemplified by halogenated alkyl groups and hydroxyalky groups. These groups represented by $R^4$ may have an intervening carbonyl moiety (C=O).

The divalent hydrocarbon group represented by $R^5$ preferably has 1 to 6 carbons. Alkylene groups are especially preferred.

Illustrative examples of the substituted or unsubstituted monovalent hydrocarbon group represented by $R^6$ include alkyl, alkenyl, aryl and aralkyl groups of 1 to 8 carbons, some or all of the hydrogens on which may be replaced with substituents such as halogen atoms or hydroxyl groups.

Next the compounds of formula (b) are described. Suitable examples of the acrylic acid or acrylic ester compound include acrylic acid, methacrylic acid, and their respective esters. Illustrative examples of methacrylic acid esters that may be used include methyl methacrylate, ethyl methacrylate, propyl methacrylate, butyl methacrylate, hexyl methacrylate, 2-ethylhexyl methacrylate, lauryl methacrylate, stearyl methacrylate, 2-hydroxyethyl methacrylate and 3-hydroxypropyl methacrylate. Use can also be made of the same esters of acrylic acid.

Illustrative examples of compounds of the formula: $CH_2=CR^3-COO-R^5-SiR^1{}_aR^2{}_{3-a}$ include $CH_2=CHCOOCH_2CH_2CH_2Si(OCH_3)_3$,
$CH_2=CHCOOCH_2CH_2CH_2Si(OCH_2CH_3)_3$,
$CH_2=C(CH_3)COOCH_2CH_2CH_2Si(OCH_3)_3$,
$CH_2=C(CH_3)COOCH_2CH_2CH_2Si(OCH_2CH_3)_3$,

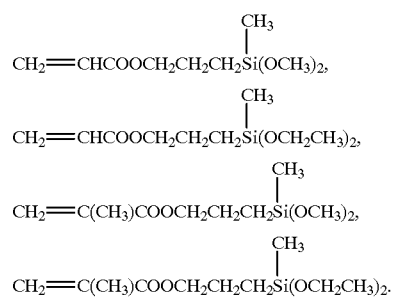

Illustrative examples of compounds of the formula: $CH_2=CR^3-COO(CH_2CHR^{3'}O)_bR^6$ include $CH_2=CHCOO(C_2H_4O)_3H$,
$CH_2=C(CH_3)COO(C_2H_4O)_{19}H$,
$CH_2=C(CH_3)COO(C_3H_6O)_5H$,
$CH_2=C(CH_3)COO(C_3H_6O)_{19}H$ and
$CH_2=CHCOO(C_2H_4O)_5(C_3H_6O)_5CH_3$.

Especially preferred acrylic acid or acrylic ester compounds are $CH_2=CHCOOH$,
$CH_2=C(CH_3)COOH$,
$CH_2=CHCOOCH_3$,
$CH_2=C(CH_3)COOCH_3$,
$CH_2=CHCOOCH_2CH_3$,
$CH_2=C(CH_3)COOCH_2CH_3$,
$CH_2=CHCOOCH_2CH_2OH$,
$CH_2=C(CH_3)COOCH_2CH_2OH$,
$CH_2=C(CH_3)COOCH(CH_2OH)_2$,

$CH_2=CHCOOCH_2CH_2CH_2Si(OCH_3)_3$,
$CH_2=CHCOOCH_2CH_2CH_2Si(OCH_2CH_8)_3$,
$CH_2=C(CH_3)COOCH_2CH_2CH_2Si(OCH_3)_3$,
$CH_2=C(CH_3)COOCH_2CH_2CH_2Si(OCH_2CH_3)_3$,

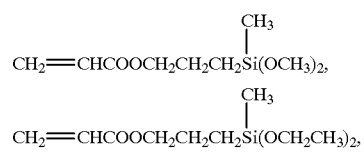

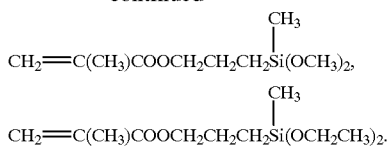

The acrylic acid or acrylic ester compound is used in an amount within a range of 0.01 to 20 moles, and preferably 0.1 to 10 moles, per mole of nitrogen atoms on the aminated organic group-bearing hydrolyzable silane. At less than 0.01 mole of the acrylic acid or acrylic ester compound, the color stability may worsen. On the other hand, use in excess of 20 moles may be disadvantageous in cost and result in poor storage stability.

Component (A) is prepared simply by mixing the aminated organic group-bearing hydrolyzable silane and the acrylic acid or acrylic ester compound in the proportions indicated above, and carrying out the following addition reaction under the application of heat.

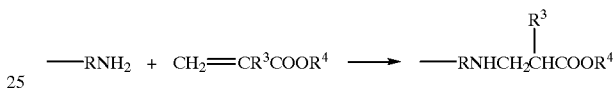

By blocking in this way primary amino groups, which have a large negative impact on the color tone in particular, excellent color stability can be obtained. If the blocking does lower the water solubility afforded by the amino groups, the actual decline in water solubility can be minimized through the compensatory effect upon water solubility achieved by using a hydroxyl group-bearing acrylic acid or acrylic ester compound or an oxyalkylene group-bearing acrylic acid or acrylic ester compound.

The addition reaction may be carried out on component (A) before it is co-hydrolyzed with the other hydrolyzable silane of formula (c) as component (B) to be described below, or it may be carried out while the hydrolyzable silane of formulas (a) and acrylic compound of formula (b) are being co-hydrolyzed with the other hydrolyzable silane of formula (c). Another possibility is to first co-hydrolyze the hydrolyzable silanes of formulas (a) and (c), then add the acrylic compound of formula (b) and carry out the addition reaction.

Component (B) used in combination with component (A) is a hydrolyzable silane of the following general formula (c), or a partial hydrolyzate thereof.

$$R^7{}_nSiR^8{}_{4-n} \qquad (c)$$

In formula (c), $R^7$ is a substituted or unsubstituted monovalent hydrocarbon group of 1 to 8 carbons, $R^8$ is an alkoxy or acyloxy group of 1 to 4 carbons, and the letter n is 0, 1 or 2. The substituted or unsubstituted monovalent hydrocarbon groups of 1 to 8 carbons represented by $R^7$ are exemplified by the same groups as mentioned above for $R^1$, such as $-CH_3$, $-CH_2CH_3$, $-CH_2CH_2CH_3$, $-CH(CH_3)_2$, $-CH_2CH_2CH_2CH_3$, $-CH(CH_3)CH_2CH_3$, $-CH_2CH(CH_3)CH_3$, $-C(CH_3)_3$, $-C_6H_5$ and $-C_6H_{13}$. The alkoxy or acyloxy groups of 1 to 4 carbons represented by $R^8$ are exemplified by the same groups as mentioned above for $R^2$, such as $-OCH_3$, $-OCH_2CH_3$, $-OCH_2CH_2CH_3$, $-OCH(CH_3)_2$, $-OCH_2CH_2CH_2CH_3$, $-OCH(CH_3)CH_2CH_3$, $-OCH_2CH(CH_3)_2$, $-OC(CH_3)_3$, $-OCOCH_3$ and $-OCOCH_2CH_3$.

Illustrative examples of the hydrolyzable silane of formula (c) include

Si(OCH$_3$)$_4$,
Si(OCH$_2$CH$_3$)$_4$,
Si(OCH$_2$CH$_2$CH$_3$)$_4$,
CH$_3$Si(OCH$_3$)$_3$,
CH$_3$Si(OCH$_2$CH$_3$)$_3$,
CH$_3$Si(OCH$_2$CH$_2$CH$_3$)$_3$,
(CH$_3$)$_2$CHSi(OCH$_3$)$_3$,
(CH$_3$)$_2$Si(OCH$_3$)$_2$,
(CH$_3$)$_2$Si(OCH$_2$CH$_3$)$_2$,
(CH$_3$)$_2$Si(OCH$_2$CH$_2$CH$_3$)$_2$,
(CH$_3$)$_2$Si(OCH$_2$CH$_2$CH$_3$)$_2$,
((CH$_3$)$_2$CH)$_2$Si(OCH$_3$)$_2$,

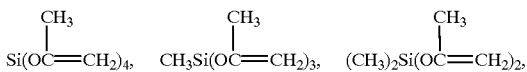

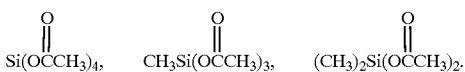

Of these, Si(OCH$_3$)$_4$, Si(OCH$_2$CH$_3$)$_4$, CH$_3$Si(OCH$_3$)$_3$, CH$_3$Si(OCH$_2$CH$_3$)$_3$, (CH$_3$)$_2$Si(OCH$_3$)$_2$, (CH$_3$)$_2$Si(OCH$_2$CH$_3$)$_2$ and partial hydrolyzates thereof are especially preferred.

Component (B) is used together with component (A) in a proportion of 5 to 200 parts by weight, and preferably 10 to 150 parts by weight, of component (B) per 100 parts by weight of component (A). More than 200 parts by weight of component (B) adversely affects the stability of the ink composition when alkaline.

In preparing component (2), a solvent is generally used. The solvent used is primarily water although water-miscible organic solvents may be added to water. Illustrative examples of suitable organic solvents include alcohols such as methanol, ethanol, 1-propanol and 2-propanol, esters such as methyl acetate, ethyl acetate and ethyl acetoacetate, ketones such as acetone and methyl ethyl ketone, and glycols such as glycerol and diethylene glycol.

The amount of solvent is preferably 400 to 5,000 parts by weight, and especially 1,000 to 3,000 parts by weight, per 100 parts by weight of the starting silanes. At less than 400 parts by weight, the reaction may proceed so far that a uniform system cannot be obtained, in addition to which the storage stability of the ink composition may worsen. On the other hand, the use of more than 5,000 parts by weight of solvent is economically disadvantageous.

The amount of water in the solvent is preferably such that the molar ratio of water to starting silanes is from 5/1 to 50/1. At a molar ratio less than 5, hydrolysis may not always readily proceed to completion and the ink composition may have a poor stability, whereas a molar ratio greater than 50 can be uneconomical.

Suitable methods for carrying out the reaction include methods wherein (i) a mixture of silanes (A) and (B) is added dropwise to water or an organic solvent containing at least the amount of water required for hydrolysis; (ii) water is added dropwise to a mixture of silanes (A) and (B) which may contain an organic solvent; (iii) hydrolyzable silane or partial hydrolyzate thereof (B) is added dropwise to water or an organic solvent containing at least the amount of water required for hydrolysis, following which hydrolyzable silane (A) is added dropwise; and (iv) hydrolyzable silane (A) is added dropwise to water or an organic solvent containing at least the amount of water required for hydrolysis, following which hydrolyzable silane (B) is added dropwise. Of these, reaction method (i) is especially preferable for assuring the stability of the water resistant ink composition.

As a result of hydrolysis of silanes (A) and (B), the organosilicon compound is obtained in the form of an aqueous solution. This solution is ready for use as component (2) or if necessary, the amount of water may be adjusted within a range of 10 to 2,000 parts by weight per 100 parts by weight of the organosilicon compound by the further addition or removal of water.

The resulting component (2) provides a good storage stability in aqueous inks, and can itself remain stable even when the dye serving as component (1) renders the system alkaline. Moreover, component (2) confers water-resistance to the ink, in addition to which it does not alter the color of the dye, thus giving the ink composition an excellent color stability.

The optimal amount of component (2) included in the water resistant ink composition of the invention varies according to the type of water-soluble dye compound and/or organic pigment compound used as component (1). Component (2) is used in an amount of 2 to 60 parts by weight, and preferably 10 to 40 parts by weight, per 10 parts by weight of component (1). Less than 2 parts by weight of component (2) is less effective, whereas the use of more than 60 parts by weight fails to yield any further improvement in effect and is undesirable in terms of cost.

The water used as component (3) serves as the solvent for the water resistant ink composition of the invention. The amount of water included in the ink composition is from 30 to 10,000 parts by weight per 10 parts by weight of component (1). With less than 30 parts by weight of water, the water resistant ink composition worsens storage stability. The ink composition with more than 10,000 parts by weight of water may fail to form images when printed.

A humectant is included as an optional ingredient in the inventive ink composition to prevent clogging of the nozzles and improve ink discharge stability in ink-jet printers. Polyhydric alcohols are preferred as the humectant. Illustrative, non-limiting, examples of suitable polyhydric alcohols include glycerol, diethylene glycol, triethylene glycol, low-molecular-weight polyethylene glycols and polyvinyl alcohol. These may be used alone or in mixtures of two or more of thereof. The amount of humectant included in the water resistant ink composition of the invention is preferably from 1 to 40 parts by weight, and especially 5 to 30 parts by weight, per 10 parts by weight of component (1). Less than 1 part by weight of the humectant may be ineffective for improving the ink discharge stability, whereas use in an amount of more than 40 parts by weight may lower the water-resistance and result in unnecessary expense.

In addition to providing printed images having excellent water-resistance, other desirable features of the inventive ink compositions include good storage stability, color stability and ink discharge stability, as well as excellent color development of the printed image. These ink compositions are particularly effective for use in ink-jet recording.

Other optional ingredients may be suitably added to the inventive water resistant ink composition to impart additional properties, insofar as the stability and other desired properties of the composition are not adversely affected. Examples of such optional ingredients include additives for conferring various properties, including ultraviolet stabilizers, anti-foaming agents and surfactants. Also, a variety of microparticulate inorganic oxides or sols thereof, water-soluble polymers or the like may be added for the purpose of reinforcement.

EXAMPLES

Synthesis examples, examples of the invention, and comparative examples are given below by way of illustration, and are not intended to limit the invention.

Synthesis Example 1

A 200-ml reactor equipped with a stirrer, a thermometer and a condenser was charged with 44.4 g (0.20 mol) of $(CH_3O)_3SiCH_2CH_2CH_2NHCH_2CH_2NH_2$, which was then heated to 90° C. under stirring. Next, 9.3 g (0.08 mol) of 2-hydroxyethyl acrylate was added dropwise over a period of 10 minutes, after which the resulting mixture was stirred at 90° C. for 5 hours to effect an addition reaction. The low fraction was removed by distillation in vacuo at 10 mmHg and 80° C., giving 53.0 g of a hydrolyzable silane (A-1).

Next, a 500-ml reactor equipped with a stirrer, a thermometer and a condenser was charged with 211 g (11.7 mol) of water. With stirring, a mixture of the 53.0 g of hydrolyzable silane (A-1) prepared above, 1.76 g (0.01 mol) of $((CH_3)_2CH)_2Si(OCH_3)_2$ and 13.7 g (0.09 mol) of $Si(OCH_3)_4$ was added dropwise to water at room temperature over a period of 10 minutes, whereupon the internal temperature rose from 25° C. to 41° C. The resulting mixture was heated to 80° C. on an oil bath and stirred for 1 hour at the temperature. An ester adapter was subsequently attached to the reactor, the temperature within the reactor was raised to 98° C. and the methanol by-product was removed, yielding 226 g of an aqueous solution of an organosilicon compound. The solution had a pH of 9.87 and a nonvolatiles content of 18.8% as determined by 3 hours of vaporization at 105° C.

Synthesis Example 2

A 500-ml reactor equipped with a stirrer, a thermometer and a condenser was charged with 211 g (11.7 mol) of water. With stirring, a mixture of 44.4 g (0.20 mol) of $(CH_3O)_3SiCH_2CH_2CH_2NHCH_2CH_2NH_2$, 9.3 g (0.08 mol) of 2-hydroxyethyl acrylate, 1.76 g (0.01 mol) of $((CH_3)_2CH)_2Si(OCH_3)_2$ and 13.7 g (0.09 mol) of $Si(OCH_3)_4$ was added dropwise to water at room temperature over a period of 10 minutes, whereupon the internal temperature rose from 25° C. to 47° C. The resulting mixture was heated to 80° C. on an oil bath and stirred for 6 hours at the temperature. An ester adapter was subsequently attached to the reactor, the temperature within the reactor was raised to 98° C. and the methanol by-product was removed, yielding 228 g of an aqueous solution of an organosilicon compound. The solution had a pH of 9.80 and a nonvolatiles content (105° C., 3 hours) of 18.5%.

Synthesis Example 3

A 500-ml reactor equipped with a stirrer, a thermometer and a condenser was charged with 211 g (11.7 mol) of water. With stirring, a mixture of 44.4 g (0.20 mol) of $(CH_3O)_3SiCH_2CH_2CH_2NHCH_2CH_2NH_2$, 1.76 g (0.01 mol) of $((CH_3)_2CH)_2Si(OCH_3)_2$ and 13.7 g (0.09 mol) of $Si(OCH_3)_4$ was added dropwise to water at room temperature over a period of 10 minutes, whereupon the internal temperature rose from 25° C. to 47° C. The resulting mixture was heated to 60 to 70° C. on an oil bath and stirred for 1 hour at the temperature. Next, 9.3 g (0.08 mol) of 2-hydroxyethyl acrylate was added dropwise over a period of 5 minutes, following which the mixture was heated to 80° C. on an oil bath and stirred for 6 hours at the temperature. An ester adapter was subsequently attached to the reactor, the temperature within the reactor was raised to 98° C. and the methanol by-product was removed, yielding 235 g of an aqueous solution of an organosilicon compound. The solution had a pH of 9.79 and a nonvolatiles content (105° C., 3 hours) of 18.3%.

Synthesis Example 4

A 500-ml reactor equipped with a stirrer, a thermometer and a condenser was charged with 211 g (11.7 mol) of water. With stirring, a mixture of 44.4 g (0.20 mol) of $(CH_3O)_3SiCH_2CH_2CH_2NHCH_2CH_2NH_2$ and 15.2 g (0.10 mol) of $Si(OCH_3)_4$ was added dropwise to water at room temperature over a period of 10 minutes, whereupon the internal temperature rose from 25° C. to 49° C. The resulting mixture was heated to 60 to 70° C. on an oil bath and stirred for 1 hour at the temperature. Next, 7.2 g (0.10 mol) of acrylic acid was added dropwise over a period of 5 minutes, following which the mixture was heated to 80° C. on an oil bath and stirred for 6 hours at the temperature. An ester adapter was subsequently attached to the reactor, the temperature within the reactor was raised to 98° C. and the methanol by-product was removed, yielding 235 g of an aqueous solution of an organosilicon compound. The solution had a pH of 9.51 and a nonvolatiles content (105° C., 3 hours) of 18.8%.

Synthesis Example 5

A 500-ml reactor equipped with a stirrer, a thermometer and a condenser was charged with 286 g (15.9 mol) of water. With stirring, a mixture of 44.4 g (0.20 mol) of $(CH_3O)_3SiCH_2CH_2CH_2NHCH_2CH_2NH_2$, 1.76 g (0.01 mol) of $((CH_3)_2CH)_2Si(OCH_3)_2$ and 13.7 g (0.09 mol) of $Si(OCH_3)_4$ was added dropwise to water at room temperature over a period of 10 minutes, whereupon the internal temperature rose from 25° C. to 43° C. The resulting mixture was heated to 60 to 70° C. on an oil bath and stirred for 1 hour at the temperature. Next, 18.7 g (0.08 mol) of $CH_2=CHCOOCH_2CH_2CH_2Si(OCH_3)_3$ was added dropwise over a period of 10 minutes, following which the mixture was heated to 80° C. on an oil bath and stirred for 6 hours at the temperature. An ester adapter was subsequently attached to the reactor, the temperature within the reactor was raised to 98° C. and the methanol by-product was removed, yielding 327 g of an aqueous solution of an organosilicon compound. The solution had a pH of 10.10 and a nonvolatiles content (105° C., 3 hours) of 15.5%.

Synthesis Example 6

A 500-ml reactor equipped with a stirrer, a thermometer and a condenser was charged with 289 g (16.1 mol) of water. With stirring, a mixture of 44.4 g (0.20 mol) of $(CH_3O)_3SiCH_2CH_2CH_2NHCH_2CH_2NH_2$, 1.76 g (0.01 mol) of $((CH_3)_2CH)_2Si(OCH_3)_2$ and 13.7 g (0.09 mol) of $Si(OCH_3)_4$ was added dropwise to water at room temperature over a period of 10 minutes, whereupon the internal temperature rose from 25° C. to 43° C. The resulting mixture was heated to 60 to 70° C. on an oil bath and stirred for 1 hour at the temperature. Next, 17.5 g (0.08 mol) of $CH_2=CHCOOCH_2CH_2CH_2Si(CH_3)(OCH_3)_2$ was added dropwise over a period of 10 minutes, following which the mixture was heated to 80° C. on an oil bath and stirred for 6 hours at the temperature. An ester adapter was subsequently attached to the reactor, the temperature within the reactor was raised to 98° C. and the methanol by-product was removed, yielding 330 g of an aqueous solution of an organosilicon compound. The solution had a pH of 10.01 and a nonvolatiles content (105° C., 3 hours) of 15.2%.

Synthesis Example 7

A 200-ml reactor equipped with a stirrer, a thermometer and a condenser was charged with 120 g (6.67 mol) of water. With stirring, a mixture of 44.4 g (0.20 mol) of $(CH_3O)_3SiCH_2CH_2CH_2NHCH_2CH_2NH_2$ and 15.2 g (0.1 mol) of $Si(OCH_3)_4$ was added dropwise to water at room temperature over a period of 10 minutes, whereupon the internal temperature rose from 25° C. to 56° C. The resulting mixture was heated to 60 to 70° C. on an oil bath and stirred for 1 hour at the temperature. An ester adapter was subsequently attached to the reactor, the temperature within the reactor was raised to 98° C. and the methanol by-product was removed, yielding 137 g of an aqueous solution of an organosilicon compound. The solution had a pH of 10.30 and a nonvolatiles content (105° C., 3 hours) of 27.3%.

The following dyes were used in the examples of the invention and the comparative examples described below: Chlorazol Black, Acid Yellow 23 and Acid Blue 92, all supplied by Tokyo Kasei K.K.; and Acid Red 14, supplied by Aldrich Chemical Co., Inc.

Example 1

Components (1) to (4) listed below under each ink color were mixed to give the respective water resistant ink compositions.

Black Ink:
(1) Water-soluble dye compound: Chlorazol Black, 5.0 g
(2) Organosilicon compound prepared in Synthesis Example 1, 26.6 g (solids, 5.0 g)
(3) Water, 58.4 g
(4) Humectant: Glycerol, 10.0 g Magenta Ink:
(1) Water-soluble dye compound: Acid Red 14, 5.0 g
(2) Organosilicon compound prepared in Synthesis Example 1, 26.6 g (solids, 5.0 g)
(3) Water, 58.4 g
(4) Humectant: Glycerol, 10.0 g Yellow Ink:
(1) Water-soluble dye compound: Acid Yellow 23, 5.0 g
(2) Organosilicon compound prepared in Synthesis Example 1, 26.6 g (solids, 5.0 g)
(3) Water, 58.4 g
(4) Humectant: Glycerol, 10.0 g Cyan Ink:
(1) Water-soluble dye compound: Acid Blue 92, 5.0 g
(2) Organosilicon compound prepared in Synthesis Example 1, 26.6 g (solids, 5.0 g)
(3) Water, 58.4 g
(4) Humectant: Glycerol, 10.0 g Ink-jet printing was carried out on plain paper with a Canon BJC-600S ink-jet printer using these four different-colored ink compositions. The printed images were evaluated as described below. The results are shown in Table 1.

Water-Fastness:
A sheet of paper that had been ink-jet printed as described above was immersed in water, then drawn out of the water whereupon the degree of change in the printed image was evaluated.
Good: No change
Fair: Slight bleeding due to water
Poor: Considerable bleeding due to water Color Development of the Image:
Color development of the printed image formed on paper by ink-jet printing was evaluated as either "Good" or "Poor."

Discharge Stability:
Printed images formed after one hour of continuous printing were examined for the presence or absence of skipping due to clogging of the nozzle discharge orifices with ink.
Good: No skipping
Fair: Some skipping
Poor: Considerable skipping Storage Stability:
This test consisted of determining the number of days that printing could be carried out without adverse changes when the printer was used continuously for 30 minutes per day. The results given in the table indicate the period until the nozzles clogged or skipping arose on the printed image.

60° C. Shelf Stability:
The ink composition was held in a 60° C. environment and changes in the composition were evaluated. The results shown in the table indicate the period during which the composition remained stable; that is, the length of time until a change in color, gelation, or some other effect arose in the composition.

Examples 2 to 6

Four different-colored water resistant ink compositions were produced by the same method as in Example 1, but using instead the respective organosilicon compounds prepared in Synthesis Examples 2 to 6. That is, the organosilicon compound prepared in Synthesis Example 2 was used in Example 2, the organosilicon compound prepared in Synthesis Example 3 was used in Example 3, the organosilicon compound prepared in Synthesis Example 4 was used in Example 4, the organosilicon compound prepared in Synthesis Example 5 was used in Example 5, and the organosilicon compound prepared in Synthesis Example 6 was used in Example 6. The printed images obtained in each of these examples were evaluated in the same manner as in Example 1. The results are shown in Table 1.

Comparative Example 1

Ink-jet printing was carried out on plain paper with a Canon BJC-600S ink-jet printer using the inks supplied with the printer. Evaluation was carried out as in Example 1. The results are shown in Table 1.

Comparative Example 2

Ink-jet printing was carried out on plain paper with an Epson MJ-500C ink-jet printer using the inks supplied with the printer. Evaluation was carried out as in Example 1. The results are shown in Table 1.

Comparative Example 3

Components (1) to (4) listed below under each ink color were mixed to give the respective water resistant ink compositions.

Black Ink:
(1) Water-soluble dye compound: Chlorazol Black, 5.0 g
(2) Pentaethylenehexamine, 5.0 g
(3) Water, 80.0 g
(4) Humectant: Glycerol, 10.0 g Magenta Ink:
(1) Water-soluble dye compound: Acid Red 14, 5.0 g
(2) Pentaethylenehexamine, 5.0 g
(3) Water, 80.0 g
(4) Humectant: Glycerol, 10.0 g Yellow Ink:
(1) Water-soluble dye compound: Acid Yellow 23, 5.0 g
(2) Pentaethylenehexamine, 5.0 g
(3) Water, 80.0 g
(4) Humectant: Glycerol, 10.0 g Cyan Ink:
  (1) Water-soluble dye compound: Acid Blue 92, 5.0 g
  (2) Pentaethylenehexamine, 5.0 g
  (3) Water, 80.0 g
  (4) Humectant: Glycerol, 10.0 g Ink-jet printing was carried out on plain paper with a Canon BJC-600S ink-jet printer using these four different-colored ink compositions. Evaluation was carried out as in Example 1. The results are shown in Table 1.

Comparative Example 4

Components (1) to (4) listed below under each ink color were mixed to give the respective water resistant ink compositions.

Black Ink:
  (1) Water-soluble dye compound: Chlorazol Black, 5.0 g
  (2) Triethylenepentamine, 5.0 g
  (3) Water, 80.0 g
  (4) Humectant: Glycerol, 10.0 g Magenta Ink:
  (1) Water-soluble dye compound: Acid Red 14, 5.0 g
  (2) Triethylenepentamine, 5.0 g
  (3) Water, 80.0 g
  (4) Humectant: Glycerol, 10.0 g Yellow Ink:
  (1) Water-soluble dye compound: Acid Yellow 23, 5.0 g
  (2) Triethylenepentamine, 5.0 g
  (3) Water, 80.0 g
  (4) Humectant: Glycerol, 10.0 g Cyan Ink:
  (1) Water-soluble dye compound: Acid Blue 92, 5.0 g
  (2) Triethylenepentamine, 5.0 g
  (3) Water, 80.0 g
  (4) Humectant: Glycerol, 10.0 g Ink-jet printing was carried out on plain paper with a Canon BJC-600S ink-jet printer using these four different-colored ink compositions. Evaluation was carried out as in Example 1. The results are shown in Table 1.

Comparative Example 5

Components (1) to (4) listed below under each ink color were mixed to give the respective water resistant ink compositions.

Black Ink:
  (1) Water-soluble dye compound: Chlorazol Black, 5.0 g
  (2) Organosilicon compound prepared in Synthesis Example 7, 18.3 g (solids content, 5.0)
  (3) Water, 66.7 g
  (4) Humectant: Glycerol, 10.0 g Magenta Ink:
  (1) Water-soluble dye compound: Acid Red 14, 5.0 g
  (2) Organosilicon compound prepared in Synthesis Example 7, 18.3 g (solids content, 5.0)
  (3) Water, 66.7 g
  (4) Humectant: Glycerol, 10.0 g Yellow Ink:
  (1) Water-soluble dye compound: Acid Yellow 23, 5.0 g
  (2) Organosilicon compound prepared in Synthesis Example 7, 18.3 g (solids content, 5.0)
  (3) Water, 66.7 g
  (4) Humectant: Glycerol, 10.0 g Cyan Ink:
  (1) Water-soluble dye compound: Acid Blue 92, 5.0 g
  (2) Organosilicon compound prepared in Synthesis Example 7, 18.3 g (solids content, 5.0)
  (3) Water, 66.7 g
  (4) Humectant: Glycerol, 10.0 g Ink-jet printing was carried out on plain paper with a Canon BJC-600S ink-jet printer using these four different-colored ink compositions. Evaluation was carried out as in Example 1. The results are shown in Table 1.

TABLE 1

| | Water-resistance | Image color development | Discharge stability | Storage stability | 60° C. Shelf stability | |
|---|---|---|---|---|---|---|
| Ex. 1 | good | good | good | 6 months | All stable 12 months | |
| Ex. 2 | good | good | good | 6 months | All stable 12 months | |
| Ex. 3 | good | good | good | 6 months | All stable 12 months | |
| Ex. 4 | good | good | good | 6 months | All stable 12 months | |
| Ex. 5 | good | good | good | 6 months | All stable 12 months | |
| Ex. 6 | good | good | good | 6 months | All stable 12 months | |
| Comp. Ex. 1 | poor | good | good | 6 months | All stable 12 months | |
| Comp. Ex. 2 | poor | good | good | 6 months | All stable 12 months | |
| Comp. Ex. 3 | fair | poor | fair | 1 month | Color changed after 3 days | |
| Comp. Ex. 4 | fair | poor | fair | 1 month | Color changed after 3 days | |
| Comp. Ex. 5 | good | good | good | 6 months | Magenta: | color changed after 2 months |
| | | | | | Black: | color changed after 1 month |
| | | | | | Cyan, yellow: | stable 12 months |

There have been described water resistant ink compositions which not only have excellent water-resistance, but also have good storage and shelf stability, good ink discharge stability and, in particular, outstanding color stability.

Japanese Patent Application No. 10-358071 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A water resistant ink composition comprising:
  (1) 10 parts by weight of a water-soluble dye compound or an organic pigment compound or both;

(2) 2 to 60 parts by weight of an organosilicon compound, and
(3) 30 to 10,000 parts by weight of water, said organosilicon compound being prepared by hydrolyzing
  (A) 100 parts by weight of a hydrolyzable silane prepared by the addition reaction of an aminated organic group-bearing hydrolyzable silane of the general formula:

$$YR^1_m SiR^2_{3-m} \qquad (a)$$

wherein $R^1$ is a substituted or unsubstituted monovalent hydrocarbon group of 1 to 8 carbons, $R^2$ is an alkoxy or acyloxy group of 1 to 4 carbons, Y is an aminated organic group and the letter m is 0 or 1, with an acrylic acid or acrylic ester compound of the general formula:

$$CH_2=CR^3-COOR^4 \qquad (b)$$

wherein $R^3$ is hydrogen or methyl, and $R^4$ is hydrogen, a substituted or unsubstituted monovalent hydrocarbon group which may have a hydroxyl or carbonyl moiety, a group of the formula $-R^5-SiR^1_a R^2_{3-m}$ wherein $R^1$ and $R^2$ are as defined above, $R^5$ is a divalent hydrocarbon group, and the letter a is 0 or 1, or a group of the formula $-(CH_2CHR^3O)_b R^6$, wherein $R^3$ is as defined above, $R^6$ is hydrogen or a substituted or unsubstituted monovalent hydrocarbon group, and the letter b is an integer from 1 to 50, in an amount corresponding to form 0.1 to 20 moles per mole of amino groups on the hydrolyzable silane of formula (a), or a partial hydrolyzate thereof, in combination with
  (B) 5 to 200 parts by weight of a hydrozable silane of the formula:

$$R^7_n SiR^8_{4-n} \qquad (C)$$

wherein $R^7$ is a substituted or unsubstituted monovalent hydrocarbon group of 1 to 8 carbons, $R^8$ is an alkoxy or acyloxy group of 1 to 4 carbons and the letter n is 0, 1 or 2, or a partial hydrolyzate thereof.

2. The water resistant ink composition of claim 1, wherein the aminated organic group-bearing hydrolyzable silane of formula (a) is selected from the group consisting of
  $H_2NCH_2CH_2NHCH_2CH_2CH_2Si(OCH_3)_3$,
  $H_2NCH_2CH_2NHCH_2CH_2CH_2Si(OCH_2CH_3)_3$,

$H_2NCH_2CH_2CH_2Si(OCH_3)_3$, $H_2NCH_2CH_2CH_2Si(OCH_2CH_3)_3$,

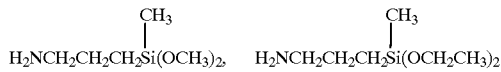

and combinations thereof.

3. The water resistant ink composition of claim 1, wherein the acrylic acid or acrylic ester compound of formula (b) is selected from the group consisting of
  $CH_2=CHCOOH$,
  $CH_2=C(CH_3)COOH$,
  $CH_3=CHCOOH_3$,
  $CH_2=C(CH_3)COOCH_3$,
  $CH_2=CHCOOC)CH_2CH_3$,
  $CH_2=C(CH_3)COOCH_2CH_3$,
  $CH_2=CHCOOCH_2CH_2OH$,
  $CH_2=C(CH_3)COOCH_2CH_2OH$,
  $CH_2=C(CH_3)COOCH(CH_2OH)_2$,

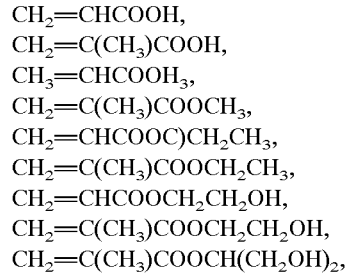

$CH_2=CHCOOCH_2CH_2CH_2Si(OCH_3)_3$,
  $CH_2=CHCOOCH_2CH_2CH_2Si(OCH_2CH_3)_3$,
  $CH_2=C(CH_3)COOCH_2CH_2CH_2Si(OH_3)_3$,
  $CH_2=C(CH_3)COOCH_2CH_2CH_2Si(OCH_2CH_3)_3$,
and combinations thereof.

4. The water resistant ink composition of claim 1, wherein the hydrolyzable silane of formula (c) is selected from the group consisting of $Si(OCH_3)_4$, $Si(OCH_2CH_3)_4$, $CH_3Si(OCH_3)_3$, $CH_3Si(OCH_2CH_3)_3$, $(CH_3)_2Si(OCH_3)_2$ and $(CH_3)_2Si(OCH_2CH_3)_2$.

5. The water resistant ink composition of claim 1, further comprising 1 to 40 parts by weight of a humectant.

6. A water resistant ink jet ink composition comprising a water resistant ink composition of claim 1.

7. A water resistant ink composition as in claim 1 wherein Y of formula (a) is $R^{10}R^9N-(R^{11}NH)_p-R^{12}-$ wherein $R^9$ and $R^{10}$ are each independently hydrogen or a monovalent hydrocarbon group of 1 to 8 carbon atoms, $R^{11}$ nd $R^{12}$ are each independently a divalent hydrocarbon group of 1 to 8 carbons, and p is 0 or an integer from 1 to 3.

8. A water resistant ink composition of claim 7 wherein Y is selected from the group consisting of $H_2NCH_2-$, $H(CH_3)NCH_2-$, $H_2NCH_2CH_2-$, $H(CH_3)NCH_2CH_2-$, $H_2NCH_2CH_2CH_2-$, $H(CH_3)NCH_2CH_2CH_2-$, $(CH_3)_2NCH_2CH_2-$, $H_2NCH_2CH_2NHCH_2CH_2CH_2-$, $H(CH_3)NCH_2CH_2NHCH_2CH_2CH_2-$, $(CH_3)_2NCH_2CH_2NHCH_2CH_2CH_2-$, $H_2NCH_2CH_2NHCH_2CH_2NHCH_2CH_2CH_2-$ and $H(CH_3)NCH_2CH_2NHCH_2CH_2NHCH_2CH_2CH_2-$.

* * * * *